US010859759B2

(12) United States Patent
Isono et al.

(10) Patent No.: US 10,859,759 B2
(45) Date of Patent: Dec. 8, 2020

(54) IMAGE DISPLAY APPARATUS

(71) Applicant: PANASONIC INTELLECTUAL PROPERTY MANAGEMENT CO., LTD., Osaka (JP)

(72) Inventors: Takamitsu Isono, Osaka (JP); Toru Tanikawa, Osaka (JP); Takafumi Umitani, Osaka (JP); Yumie Itou, Osaka (JP); Xiao Han, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/467,330

(22) PCT Filed: Sep. 12, 2018

(86) PCT No.: PCT/JP2018/033754
§ 371 (c)(1),
(2) Date: Jun. 6, 2019

(87) PCT Pub. No.: WO2019/065230
PCT Pub. Date: Apr. 4, 2019

(65) Prior Publication Data
US 2019/0361169 A1 Nov. 28, 2019

(30) Foreign Application Priority Data

Sep. 26, 2017 (JP) .................. 2017-185268
Sep. 26, 2017 (JP) .................. 2017-185285

(51) Int. Cl.
*F21V 8/00* (2006.01)
(52) U.S. Cl.
CPC ........... *G02B 6/0088* (2013.01); *G02B 6/009* (2013.01); *G02B 6/0055* (2013.01)

(58) Field of Classification Search
CPC .... G02B 6/0088; G02B 6/0055; G02B 6/009; G02B 6/005; G02B 6/0091; G02B 6/0031; H04N 5/64; G02F 1/1333; G09F 9/00
See application file for complete search history.

(56) References Cited

U.S. PATENT DOCUMENTS

2008/0143918 A1* 6/2008 Kim ................ G02F 1/133608
349/58
2009/0015748 A1 1/2009 Kujiraoka et al.
(Continued)

FOREIGN PATENT DOCUMENTS

CN 104949011 A 9/2015
JP 2005-148433 A 6/2005
(Continued)

OTHER PUBLICATIONS

Machine English Translation of JP2018129124A, Sugiyama et al. (Year: 2018).*
(Continued)

*Primary Examiner* — Isiaka O Akanbi
*Assistant Examiner* — Glenn D Zimmerman
(74) *Attorney, Agent, or Firm* — McDermott Will & Emery LLP

(57) ABSTRACT

An image display apparatus includes a display panel including a front surface on which an image is displayed, a base plate disposed behind the display panel, a light guide plate disposed between the display panel and the base plate, a light source, a light source cover, and a corner component. The light source is disposed along an edge of the base plate, and emits light incident on an edge face of the light guide plate. The light cover is elongated and covers a front of the light source. The corner component is disposed along a corner of the base plate, laterally supports the display panel, (Continued)

and includes a portion that overlaps the light source cover in a front to back direction.

13 Claims, 18 Drawing Sheets

(56) References Cited

U.S. PATENT DOCUMENTS

| | | |
|---|---|---|
| 2010/0118514 A1 | 5/2010 | Cho et al. |
| 2011/0063541 A1 | 3/2011 | Oh |
| 2014/0049715 A1 | 2/2014 | Kuo et al. |
| 2014/0232942 A1* | 8/2014 | Yahata .................... H04N 5/64 348/725 |
| 2014/0313771 A1 | 10/2014 | Song |
| 2015/0055053 A1 | 2/2015 | Sasaoka et al. |
| 2015/0241618 A1 | 8/2015 | Jung |
| 2018/0224595 A1* | 8/2018 | Sugiyama .............. G02B 6/009 |

FOREIGN PATENT DOCUMENTS

| | | | |
|---|---|---|---|
| JP | 2008-009164 A | 1/2008 | |
| JP | 2009-037212 A | 2/2009 | |
| JP | 2010-118348 A | 5/2010 | |
| JP | 2012-022894 A | 2/2012 | |
| JP | 2013-218056 A | 10/2013 | |
| JP | 2015-040921 A | 3/2015 | |
| JP | 2018129124 A * | 8/2018 | ........... G02B 6/0083 |
| WO | 2012/102193 A1 | 8/2012 | |
| WO | 2014/026364 A1 | 2/2014 | |

OTHER PUBLICATIONS

International Search Report and Written Opinion dated Nov. 27, 2018 in International Application No. PCT/JP2018/033754; with partial English translation.

Extended European Search Report issued for European patent application No. 18862461.3 dated Sep. 28, 2020.

* cited by examiner

IMAGE DISPLAY APPARATUS

CROSS-REFERENCE OF RELATED APPLICATIONS

This application is the U.S. National Phase under 35 U.S.C. § 371 of International Patent Application No. PCT/JP2018/033754, filed on Sep. 12, 2018, which in turn claims the benefit of Japanese Application No. 2017-185268 and Japanese Application No. 2017-185285, both of which were filed on Sep. 26, 2017, the entire disclosures of which Applications are incorporated by reference herein.

TECHNICAL FIELD

The present disclosure relates to an image display apparatus including a display panel that is a liquid crystal cell and the like.

BACKGROUND ART

Patent Literature (PTL) 1 discloses an image display apparatus including a panel that displays an image, a chassis that supports the panel at a front surface thereof, circuit boards fixed to a rear surface of the chassis, and a front and back cover that retain these components inside the image display.

CITATION LIST

Patent Literature

PTL 1: Japanese Unexamined Patent Application Publication No. 2008-9164.
PTL 2: Japanese Unexamined Patent Application Publication No. 2009-37212.

SUMMARY OF THE INVENTION

Technical Problem

The present disclosure provides a lightweight image display apparatus including a display panel.

Solution to Problem

An image display apparatus in the present disclosure includes a display panel including a front surface on which an image is displayed; a base plate disposed behind the display panel; a light guide plate disposed between the display panel and the base plate; a light source that is elongated, disposed along an edge of the base plate, and emits light incident on an edge face of the light guide plate; a light source cover that is elongated and covers a front of the light source; and a corner component (i) that is disposed along a corner of the base plate, (ii) that laterally supports the display panel, and (iii) includes a portion that overlaps the light source cover in a front to back direction.

Advantageous Effect of Invention

An image display apparatus in the present disclosure includes a display panel and is lightweight.

DESCRIPTION OF EXEMPLARY EMBODIMENTS

Figure 1:
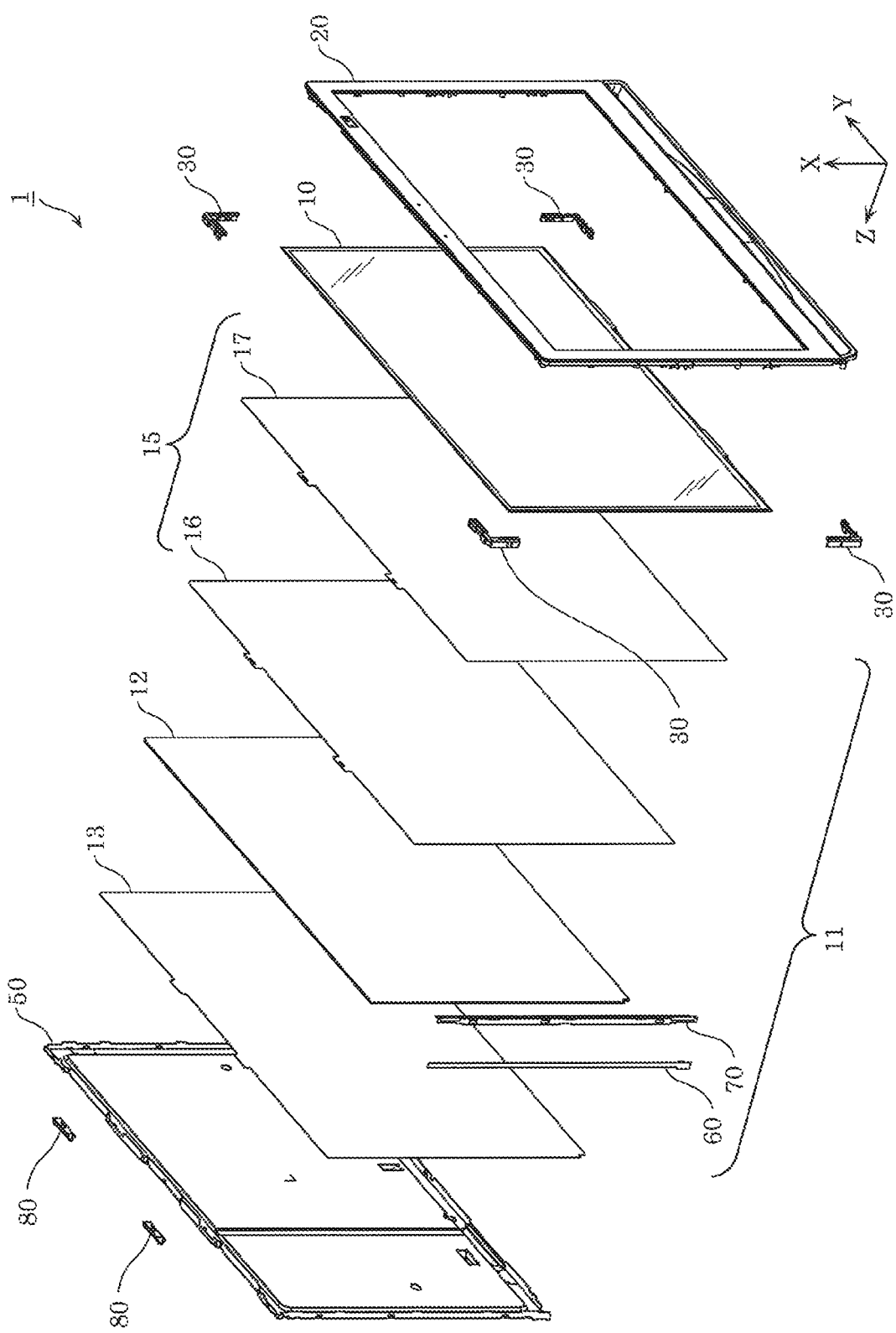
FIG. 1 is an exploded perspective view of an image display apparatus according to Embodiment 1.

The inventors have identified the following problems regarding conventional image display apparatuses. Conventional image display apparatuses, e.g. liquid crystal televisions, include a bezel that covers outer edges of a display panel from a front thereof that is, for example, a liquid crystal cell. The bezel included in the image display apparatuses is, for example, a rectangular ring component like the front cover in the above PTL 1. The bezel is, for example, used for decorating the image display apparatus, anteriorly supporting the outer edges of the display panel, and the like.

A rectangular ring-shaped frame (referred to as, for example, molded frame) is disposed at the back of the bezel. The rectangular ring-shaped frame surrounds the display panel in all directions, and limits any movement of the display panel in all directions (laterally supports the display panel) by abutting against the edge faces of the display panel.

When the image display apparatuses include a light source along an edge face of a light guide plate, a so-called edge-lit backlight unit, the rectangular ring-shaped frame also serves as a shield for making sure light emitted from the light source does not leak frontward. The frame can also serve as a support that supports an optical component, e.g. a light guide plate.

This enables the rectangular ring-shaped frame disposed at the back of the bezel to fulfill various roles in the image display apparatuses. In recent years, however, it has become necessary, for example, to make all types of components included in image display apparatuses lighter in order to meet the demand for lighter image display apparatuses, and the above frame is no longer exceptional. Accordingly, the rectangular ring-shaped frame can possibly be made lighter by dispensing with a portion thereof, but then the problem arises of how the frame will support the display panel and the like. Since the above problem of light leaking also needs to be dealt with, it is not easy to decide how to handle the configuration of the frame that laterally supports the display panel.

The present disclosure is based on these observations and the inventors were able to conceptualize a structure of a lightweight image display apparatus including a display panel as a result of their studies.

Hereinafter, Embodiments 1 and 2 will be described with reference to the drawings when appropriate. However, unnecessarily detailed descriptions may be omitted. For example, detailed descriptions of well-known matters or descriptions of components that are substantially the same as components described previous thereto may be omitted. This is to avoid redundancy and facilitate understanding of the descriptions for those skilled in the art.

Note that the accompanying drawings and subsequent descriptions are provided by the inventors of the present invention to facilitate sufficient understanding of the present disclosure by those skilled in the art, and are thus not intended to limit the scope of the subject matter recited in the claims.

In the subsequent embodiments, the top to bottom direction is represented by an X-axis, the front to back direction is represented by a Z-axis, and the left to right direction is represented by a Y-axis for the sake of description. However, these do not limit the orientation of the image display apparatus according to the present disclosure at the time of manufacture or usage. In the subsequent descriptions, for example, the positive X-axis indicates the direction of the arrow of the X-axis and the negative X-axis indicates the direction opposite of the positive X-axis. The same applies to the Y-axis and the Z-axis.

Hereinafter, Embodiment 1 will be described with reference to FIGS. 1 to 8. A configuration outline of the image display apparatus according to Embodiment 1 with reference to FIG. 1.

Embodiment 1

1. Configuration Outline of Image Display Apparatus

FIG. 1 is an exploded perspective view of image display apparatus 1 according to Embodiment 1. As illustrated in FIG. 1, image display apparatus 1 according to the present embodiment includes display panel 10, corner component 30, and base plate 50.

In the present embodiment, image display apparatus 1 is a liquid crystal television. In other words, display panel 10 is a so-called liquid crystal cell including a liquid crystal layer disposed between two light distribution films, and has a multi-layer structure in which, besides the light distribution films and the liquid crystal layer, a transparent electrode, glass substrate, color filter, polarization filter, and the like are laminated to each other.

Backlight unit 11 is disposed behind display panel 10 (positive Z-axis). Backlight unit 11 includes light guide plate 12 disposed in front of reflection sheet 13, light source 60 which emits light incident on an edge face of light guide plate 12, and optical sheet section 15 that diffuses the light emitted from a front surface of light guide plate 12 and the like. In the present embodiment, optical sheet section 15 includes first optical sheet 16 and second optical sheet 17. First optical sheet 16 and second optical sheet 17 are each a diffusion sheet, prism sheet, or a laminate thereof. Note that the number of optical sheets included in optical sheet section 15 is not particularly limited, and that optical sheet section 15 may include one or more optical sheets.

In the present embodiment, light source 60 is disposed so that light emitted from light-emitting diodes (LEDs) is incident inside light guide plate 12 from a left edge face of light guide plate 12 (in a front view). In other words, in the present embodiment, backlight unit 11 is an edge-lit backlight unit. An elongated light source cover 70 is disposed in front of light source 60 (negative Z-axis).

Base plate 50 is disposed behind backlight unit 11 and is a plate-shaped component that retains backlight unit 11, display panel 10, and the like. Base plate 50 is formed, for example, by performing a stamping treatment, e.g. raising a metal plate including aluminum, an aluminum alloy, or iron. Two optical sheet holders 80 that support optical sheet section 15 are attached to an upper side of the rectangular base plate 50. Optical holders 80 will be described later with reference to FIGS. 5 to 7.

Corner component 30 is disposed at a corner of base plate 50 and supports display panel 10. In the present embodiment, the L-shaped corner component 30 is disposed at each of the four corners of the rectangular base plate 50 in the front view. These four corner components 30 are included in image display apparatus 1 instead of a conventional rectangular ring-shaped frame called a molded frame and the like.

Each of the four corner components 30 laterally supports the corners of the rectangular display panel 10. To be specific, one corner component 30 is disposed not at a vertex of the corner of display panel 10, but abuts against edge faces proximate to the vertex (edge face pointing in the direction of the X-axis and edge face pointing in the direction of the Y-axis). With this, movement of display panel 10 is restricted in all directions (movement along an XY-plane). Since bezel 20 is disposed in front of edges of display panel 10, movement of display panel 10 is restricted in the front to back direction (Z-axis) due to backlight unit 11 and bezel 20.

Note that in the present embodiment, each of the four corner components 30 are independent (separate components) from one another and the two adjacent corner components 30 are not directly connected in either direction. A structure of corner component 30 and a surrounding thereof in image display apparatus 1 with these characteristics will be described below with reference to FIGS. 2 to 4.

2. Positional Relationship of Light Source Cover and Corner Component

Figure 2:
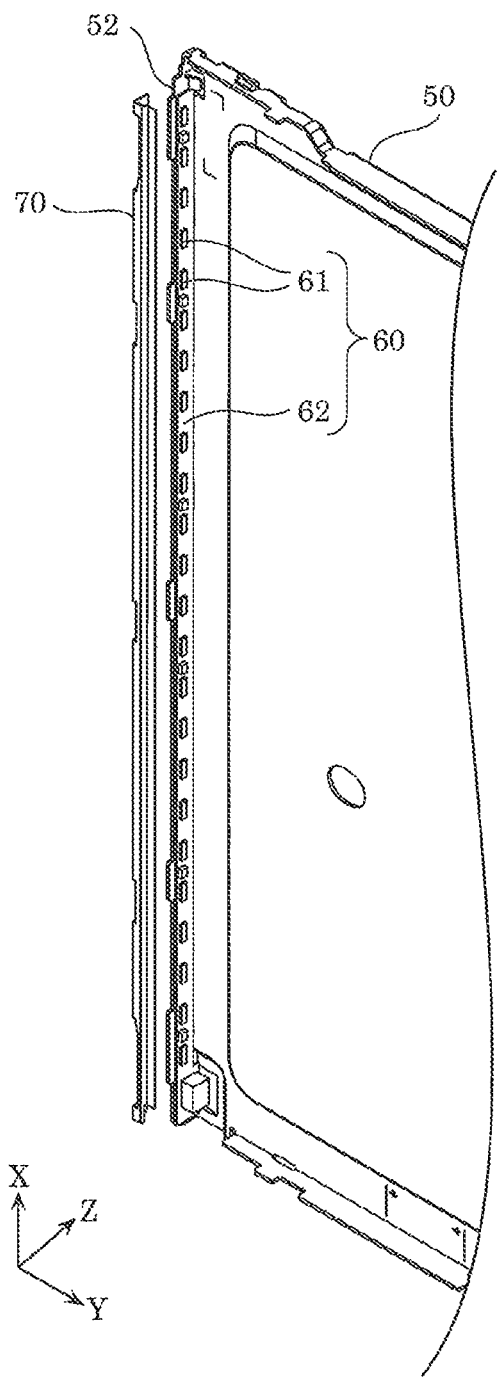
FIG. 2 is a perspective view of a light source cover detached from a light source according to Embodiment 1.

FIG. 2 is a perspective view of light source cover 70 detached from light source 60 according to Embodiment 1.

Figure 3A:
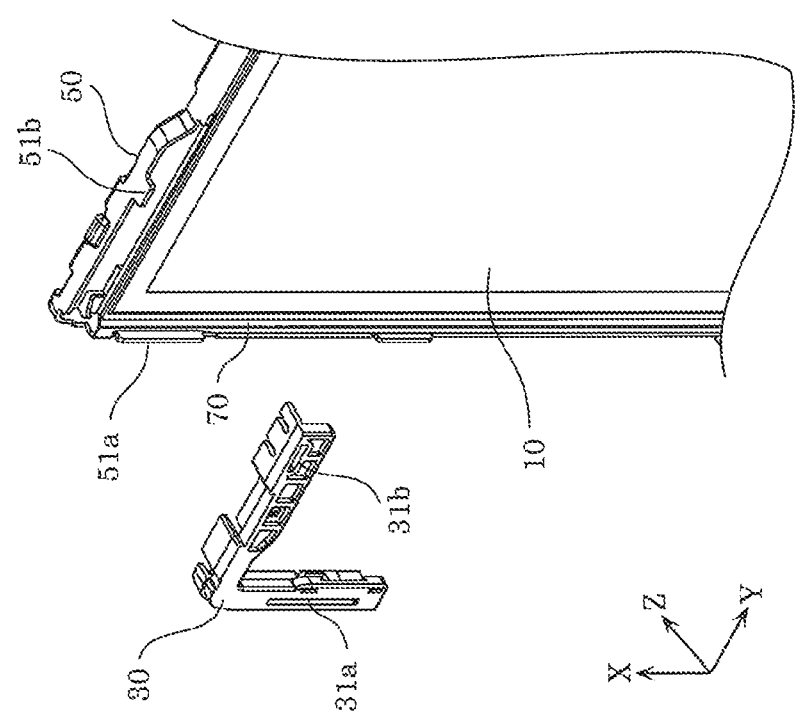
FIG. 3A is a perspective view of a corner component detached from the light source cover according to Embodiment 1.
Figure 3B:
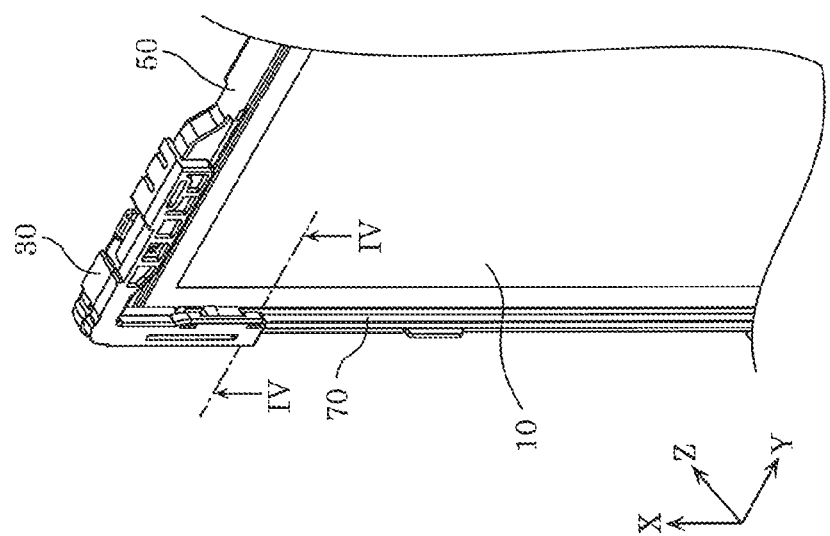
FIG. 3B is a perspective view of the corner component disposed in a regular position thereof according to Embodiment 1.
Figure 4:
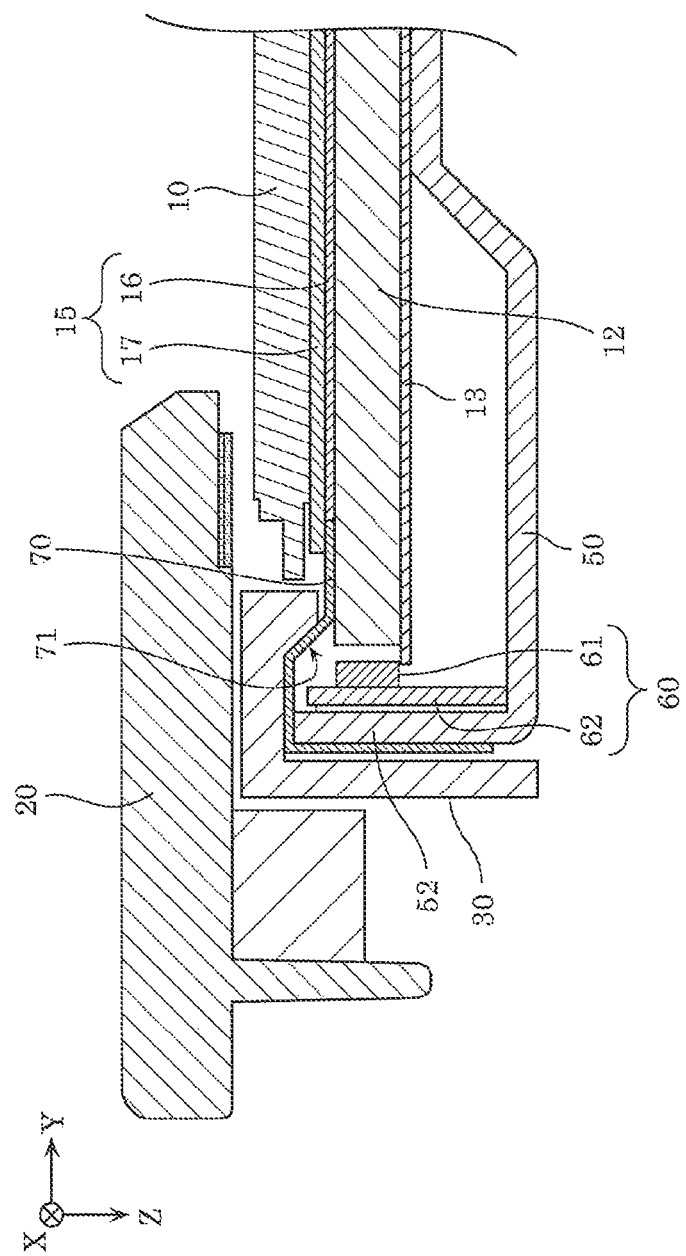
FIG. 4 is a diagram showing a partial cross-section of the image display apparatus in a YZ-plane along line IV-IV in FIG. 3B.

FIG. 3A is a perspective view of corner component 30 detached from light source cover 70 according to Embodiment 1, and FIG. 3B is a perspective view of corner component 30 disposed in a regular position thereof according to Embodiment 1. FIG. 4 is a diagram showing a partial cross-section of image display apparatus 1 in a YZ-plane along line IV-IV in FIG. 3B.

As illustrated in FIG. 2, light source 60 is disposed along an edge of base plate 50 and is an elongated component that emits light to an edge face of light guide plate 12 (see FIG. 1). In the present embodiment, light source 60 includes a vertically (X-axis) elongated substrate 62 and LED elements 61 arranged along a length of substrate 62. Substrate 62 is fixed to side wall 52 that is upright along the Z-axis and the edge of base plate 50.

Light source cover 70 is an elongated component that covers the front of light source 60. Light source cover 70 includes, for example, stainless copper with a thickness of approximately 0.2 mm, and is fixed to side wall 52 of base plate 50. Light source cover 70 serves as a shade for limiting light emitted from light source 60 to leak frontward.

Longitudinal end portions of light source cover 70 are covered by corner component 30. For example, an upper longitudinal end portion of light source cover 70 is covered by corner component 30 attached to an upper left corner of base plate 50 as illustrated in FIGS. 3A and 3B. Corner component 30 includes engagement holes 31a and 31b, and protrusions 51a and 51b are disposed at the upper left corner of base plate 50. Corner component 30 is positioned by inserting protrusion 51a on base plate 50 in engagement hole 31a in corner component 30 and inserting protrusion 51b on base plate 50 in engagement hole 31b in corner component 30. In this state, corner component 30 is fixed to base plate 50 with screws and the like not illustrated.

In the present embodiment, as described above, corner component 30 is disposed at each of the four corners of base plate 50 and display panel 10 is supported along the X-axis and Y-axis by these four corner component 30 that are separate from one another. In other words, there is no component that laterally supports display panel 10 in front of light source 60 disposed at the edge of base plate 50. Supposing image display apparatus 1 does not include light source cover 70, the following problem may, therefore, occur.

As illustrated in FIG. 4, light source 60 is disposed so that optical axes of LED elements 61 are perpendicular to the edge face of light guide plate 12, but the light emitted from LED elements 61 has a predetermined spread (light distribution angle). Thus, a portion of the light emitted from LED elements 61 propagates frontward (upward in FIG. 4 (negative Z-axis)), and as a result, there is a risk of, for example, light leaking from a gap between display panel 10 and bezel 20. Light that is not mediated by light guide plate 12 is incident on the end portion of display panel 10, and there is a risk of the end portion on which light source 60 is disposed appearing unnatural when looking at display panel 10 head-on (front view).

In the present embodiment, however, as illustrated in FIG. 4, light source cover 70 covers the front of light source 60. With this, the risk of the light emitted from light source 60 leaking frontward from image display apparatus 1 (risk of unnecessary light leaking) is reduced.

In light source 60, LED elements 61 are, for example, also disposed at longitudinal end portions of substrate 62 in order for the light to be vertically and uniformly incident on display panel 10. Thus, there is also a risk of the light emitted from light source 60 leaking from the longitudinal end portion of light source cover 70.

In the present embodiment, however, corner component 30 covers the longitudinal end portions of light source cover 70 from the front. Thus, unnecessary light leaking from the longitudinal end portions of light source cover 70 is limited.

As described above, image display apparatus 1 according to the present embodiment includes display panel 10 including the front surface on which an image is displayed, base plate 50 disposed behind display panel 10, light guide plate 12 disposed between display panel 10 and base plate 50, light source 60, light source cover 70, and corner component 30. Light source 60 is disposed along the edge of base plate 50 and emits light to the edge face of light guide plate 12. Light source cover 70 is elongated and covers the front of light source 60. Corner component 30 is disposed along the corner of base plate 50, laterally supports display panel 10, and includes a portion that overlaps in the front to back direction.

This configuration makes it possible to restrict the movement of display panel 10 in all directions due to corner component 30 being disposed at the corner of base plate 50. Therefore, a component long enough to surround the display panel such as the rectangular ring-shaped frame in a conventional image display apparatus, e.g. a liquid crystal television, is no longer necessary, and the component that laterally supports display panel 10 can be made lighter.

Unnecessary light leaking to the front of image display apparatus 1 is limited since light source cover 70 is disposed in front of light source 60 that emits lights to the edge face of light guide plate 12. Since a portion of corner component 30 overlaps light source cover 70 in the front-to-back direction, unnecessary light leaking from the longitudinal end portions of light source cover 70 is limited by corner component 30.

In this manner, image display apparatus 1 in the present embodiment includes display panel 10 and is a lightweight image display apparatus. In the present embodiment, image display apparatus 1 can be made lighter by limiting the component that laterally supports display panel 10 to only a portion corresponding to the corner of display panel 10 (corner component 30), and in this case, unnecessary light may leak from light source 60 for example. The leaking of unnecessary light is, for example, limited by light source cover 70 and corner component 30. Image display apparatus 1 according to the present embodiment makes it possible, however, to be lightweight without sacrificing quality as image display apparatus.

In the present embodiment, as illustrated in FIG. 4, light source cover 70 includes light-reflective surface 71 facing light source cover 70. To be specific, an optical reflectance of the inner surface of light source cover 70 including stainless copper as mentioned above is increased by, for example, polishing it, and as a result, the inner surface of light source cover 70 serves as light-reflective surface 71 that efficiently returns the light from light source 60 thereto.

In other words, the light emitted by LED elements 61 of light source 60 also includes the light that propagates forward as mentioned above, i.e., the light propagating toward light source cover 70. By returning this light that propagates toward light source cover 70 toward light source 60 via light-reflective surface 71, the light can be used as again as light to be emitted to the edge face of light guide plate 12. In other words, light source cover 70 limits the leaking of unnecessary light, makes it possible to increase a ratio of light that can be used for displaying an image on display panel 10.

In image display apparatus 1 according to the present embodiment, a structure is used in which optical sheet section 15 is supported by holders disposed between two corner components 30. The structure related to these holders will be described with reference to the above FIG. 1 and FIGS. 5 to 7.

3. Structure Related to Optical Sheet Holders

Figure 5:
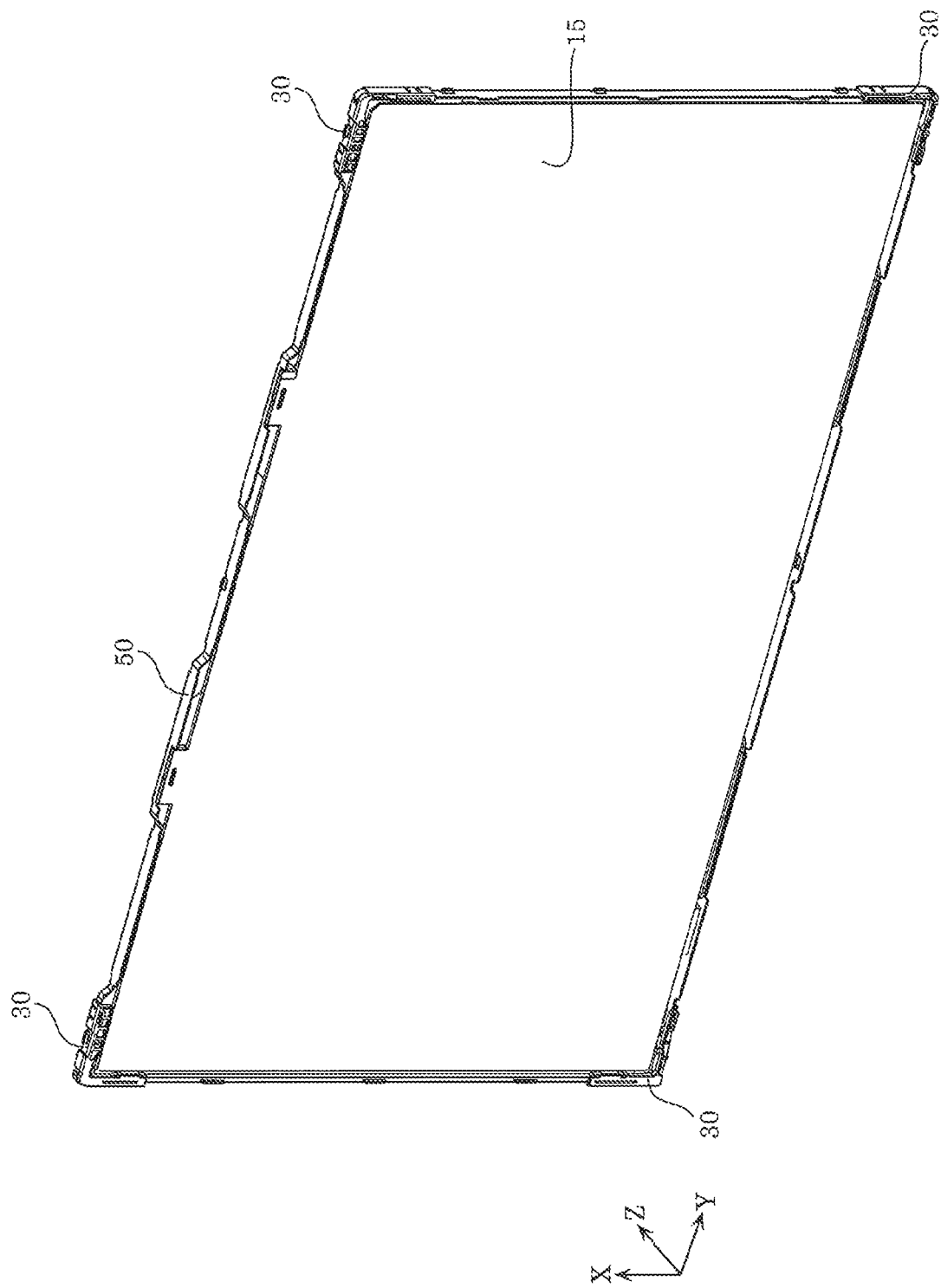
FIG. 5 is a perspective view of an optical sheet section disposed on a base plate according to Embodiment 1.
Figure 6:
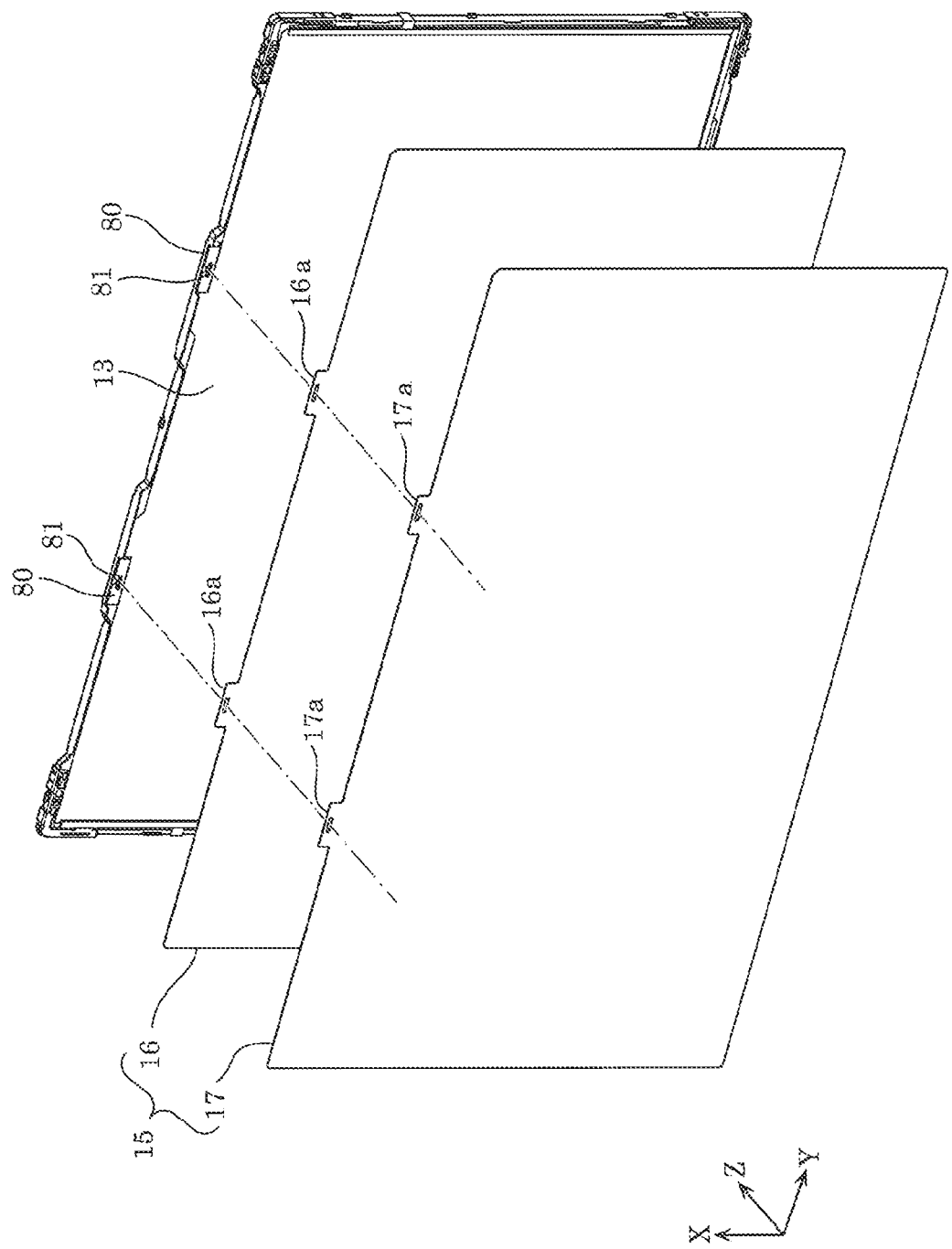
FIG. 6 is a perspective view of the optical sheet section detached from the base plate according to Embodiment 1.
Figure 7:
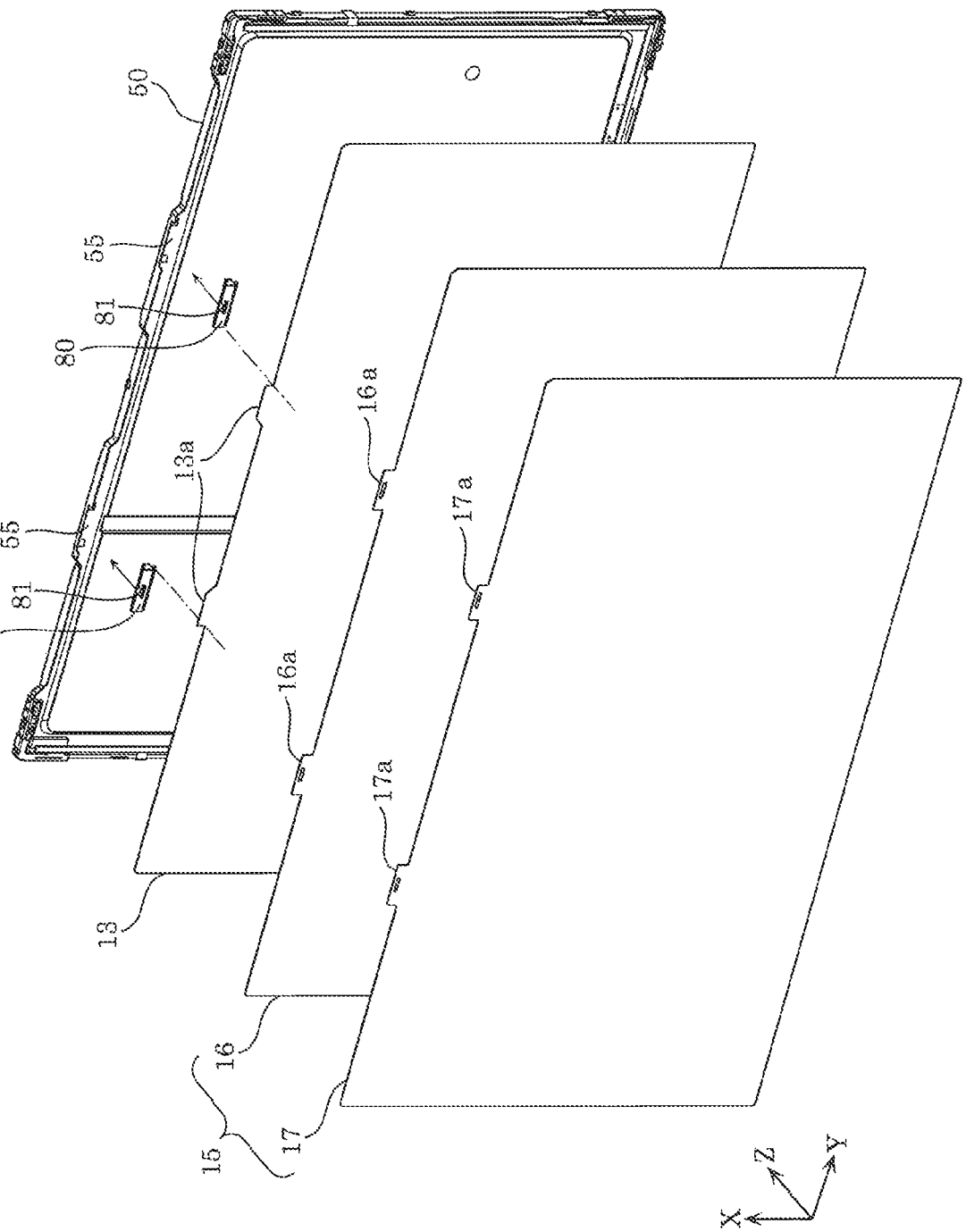
FIG. 7 is a perspective view of the optical sheet section, a reflection sheet, and optical sheet holders detached from the base plate according to Embodiment 1.

FIG. 5 is a perspective view of optical sheet section 15 disposed on base plate 50 according to Embodiment 1. FIG. 6 is a perspective view of optical sheet section 15 detached from base plate 50 according to Embodiment 1. FIG. 7 is a perspective view of optical sheet section 15, reflection sheet 13, and optical holders 80 detached from base plate 50 according to Embodiment 1. Note that in FIG. 7, illustration of light guide plate 12 disposed between reflection sheet 13 and optical sheet section 15 is omitted.

As illustrated in FIG. 1 and FIGS. 5 to 7, image display apparatus 1 according to the present embodiment includes optical sheet section 15 disposed between light guide plate 12 and display panel 10. In the present embodiment, optical sheet section 15 includes first optical sheet 16 and second optical sheet 17 which are prism sheets, diffusion sheet, or the like. Corner component 30 is disposed at each of the four corners of base plate 50 that is rectangular in the front view. Optical holders 80 that support optical sheet section 15 are disposed on base plate 50 between two corner components 30 disposed at adjacent corners.

To be specific, two optical holders 80 are disposed between the upper left corner component 30 and the upper right corner component 30 when looking at base plate 50 in the front view of base plate 50. More specifically, as illustrated in FIG. 7, two holder fittings are disposed on the upper side of the rectangular base plate 50. For example, by engaging the hooks of the resin optical holders 80 with the holes in holder fittings 55, optical holders 80 are attached to holder fittings 55.

The two optical holders 80 are each an example of the support that support at least one optical sheet, and each include protrusion 81, as illustrated in FIGS. 6 and 7. First optical sheet 16 includes two tabs 16a that protrude from an upper side thereof and second optical sheet 17 includes two tabs 17a that protrude from an upper side thereof. The two tabs 16a and the two tabs 17a each include an opening in which protrusion 81 can be inserted. Protrusion 81 of the left side optical holder 80 in the front view is inserted into the openings of the left side tab 16a and the left side tab 17a in the front view. Protrusion 81 of the right side optical holder 80 in the front view is inserted into the openings of the right side tab 16a and the right side tab 17a in the front view. With this, optical sheet section 15 is supported in a suspended fashion by the two optical holders 80. This makes it possible to, for example, stably support optical sheet section 15 while allowing optical sheet section 15 to expand and contract in the XY-plane due to temperature changes by having the two optical holders 80 support optical sheet section 15 in a suspended fashion.

In conventional image display apparatuses, it is possible, for example, to support an optical sheet such as a prism sheet using a portion of the upper side of the rectangular ring-shaped frame that surrounds the display panel. In regard to this, in image display apparatus 1 according to the present embodiment, there is no such corresponding component on the upper side (component that connects the upper left and upper right corner components 30 in the front view). Accordingly, at least one (two in the present embodiment) optical holder 80 is disposed on base plate 50 using a space between the upper left and upper right corner components 30. This makes it possible to correctly support optical sheet section 15.

It is possible to support optical sheet section 15 by, for example, hanging optical sheet section 15 from a lanced portion of base plate 50 without using optical holders 80. In this case, however, it is necessary, for example, to lance a portion proximate to a length of the rectangular base plate 50 for keeping base plate 50 thin, and in this case, there is a risk of the strength of the lanced portion being reduced. In regard to this, in image display apparatus 1 according to the present embodiment, optical holders 80 are attached to base plate 50 by engaging optical holders 80 with small holes in base plate 50, and there is less risk of the strength of base plate 50 decreasing. It is also possible to attach optical holders 80 to base plate 50 by, for example, inserting the protrusions of base plate 50 into the holes in optical holders 80 without having to perform any processes that cause a decrease in strength due to holes, cutouts or the like.

Note that in the present embodiment, the two optical holders 80 disposed on base plate 50 may also be the same component. In other words, two horizontally adjacent optical holders 80 may be shared. This is advantageous for improving the manufacturing efficiency or limiting the manufacturing cost of image display apparatus 1.

In image display apparatus 1 according to the present embodiment, as illustrated in FIGS. 1 and 7, reflection sheet 13, which includes reflection sheet 13 disposed between light guide plate 12 and base plate 50, is restricted in movement to a direction perpendicular to the front to back direction due to abutting against optical holders 80. Note that reflection sheet 13 is an example of a reflection sheet.

To be specific, reflection sheet 13 includes protrusions 13a protruding from an upper part thereof as illustrated in FIG. 7, and reflection sheet 13 is restricted in movement horizontally due to protrusions 13a abutting against optical holders 80. More specifically, the two horizontally adjacent protrusions 13a are disposed on reflection sheet 13, and the two optical holders 80 are interposed between these two protrusions 13a. This configuration makes it possible to limit the movement of reflection sheet 13 to the left side (negative Y-axis) due to the left side protrusion 13a of the two protrusions 13a abutting against the left side optical holder 80. The movement of reflection sheet 13 to the right side (positive Y-axis) is limited due to the right side protrusion 13a of the two protrusions 13a abutting against the right side optical holder 80.

This enables optical holders 80 according to the present embodiment to restrict a position of reflection sheet 13 in addition to supporting optical sheet section 15. This makes it possible to, for example, to reduce the number of components included in image display apparatus 1. Reflection sheet 13 is restricted in movement due to protrusions 13a in the middle portion and not the left and right end portions. Thus, for example, even when the horizontal space of reflection sheet 13 on base plate 50 is comparatively large, reflection sheet 13 is prevented from inclining horizontally. In other words, reflection sheet 13 is retained in the correct position with respect to light guide plate 12.

4. Positioning Structure of Light Source

Figure 8:
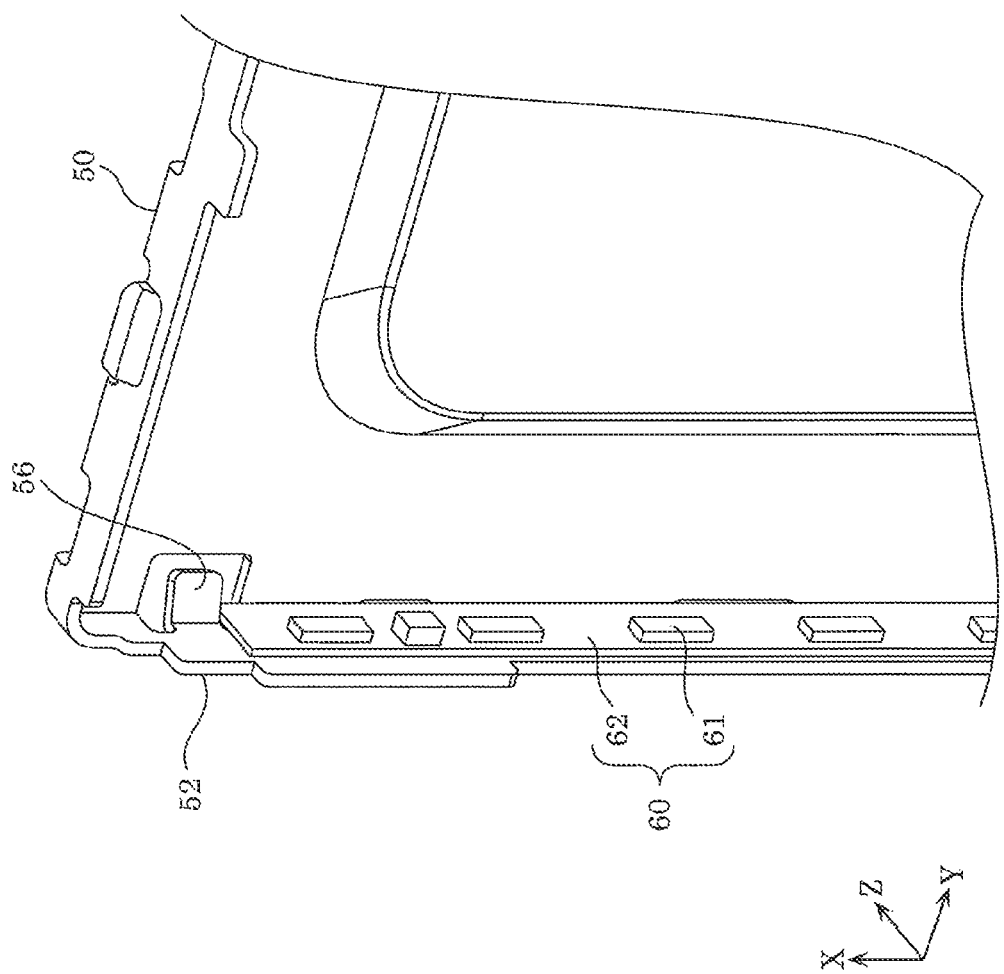
FIG. 8 is a perspective view of a positioning structure of the light source according to Embodiment 1.

FIG. 8 is a perspective view of a positioning structure of light source 60 according to Embodiment 1. As illustrated in FIG. 8, base plate 50 includes tongue piece 56 that is lanced from a portion of base plate 50 and abuts against the longitudinal end portion of light source 60.

This makes it possible, for example, to correctly decide a vertical position of light source 60 without using a separate component for the positioning of light source 60 due to base plate 50 including the lanced tongue piece 56. This contributes to the improved image quality of the image displayed by image display apparatus 1 and the like. In the present embodiment, a portion including tongue piece 56 is the corner of base plate 50, and is a portion in which bending stress is not easily concentrated when, for example, the end portions of base plate 50 along the Y-axis or X-axis are pressed. It is, therefore, possible to say that a decrease in strength of base plate 50 due to tongue piece 56 does not easily occur.

It is possible to form a bent portion that abuts against the edge face of light source 60 by, for example, bending (folding inward) a portion of side wall 52 of base plate 50 with the Z-axis at a center thereof. However, since a position of the bent portion that abuts against the edge face of light source 60 easily changes depending on a bending angle of the bent portion, it is difficult to increase the precision of the position. For example, keeping in mind the demand for a thin image display apparatus 1, side wall 52 may be as low as possible (span of the Z-axis), but this also increases the risk that a span of the bent portion is not sufficient for the positioning of light source 60.

In regard to this, in the present embodiment, tongue piece 56 is formed by lancing a portion of base plate 50 and raising this portion along a length of light source 60 (X-axis). Light source 60 is positioned by having an edge face of substrate 62 of light source 60 abut against the edge face of a length of tongue piece 56 (facing in the direction of the X-axis).

In this case, for example, the position of the edge face of tongue piece 56 facing in the direction of the X-axis remains substantially fixed even when a tilt angle of tongue piece 56 in the XY-plane changes. In other words, the component used for the positioning of light source 60 (tongue piece 56) can be readily and accurately manufactured. In other words, in image display apparatus 1 according to the present embodiment, light source 60 can be positioned accurately without the need for intricate labor or complex components.

In the present embodiment, as illustrated in FIG. 8, a distal end of tongue piece 56 is disposed inward (positive Z-axis). With this, a risk of an end portion of reflection sheet 13 slipping under tongue piece 56 is reduced when disposing reflection sheet 13 (see FIG. 7) on base plate 50.

Other Embodiments Related to Embodiment 1

Embodiment 1 is described above as an example of the technique disclosed in the present application. However, the technique in the present disclosure is not limited to the above embodiments; various changes, substitutions, additions, omissions, etc., may be made to the embodiments. Each component included in the above Embodiment 1 may be combined to achieve new embodiments. Accordingly, other embodiments related to Embodiment 1 will be exemplified below.

For example, in base plate 50 according to Embodiment 1, as illustrated in FIG. 7, recesses are present on the upper side of base plate 50 in areas where holder fittings 55 are not disposed between the upper left corner component 30 and the upper right corner component 30. These recesses may include a receiver that receives a signal indicating an instruction to, for example, turn on and turn off image display apparatus 1.

Figure 9:
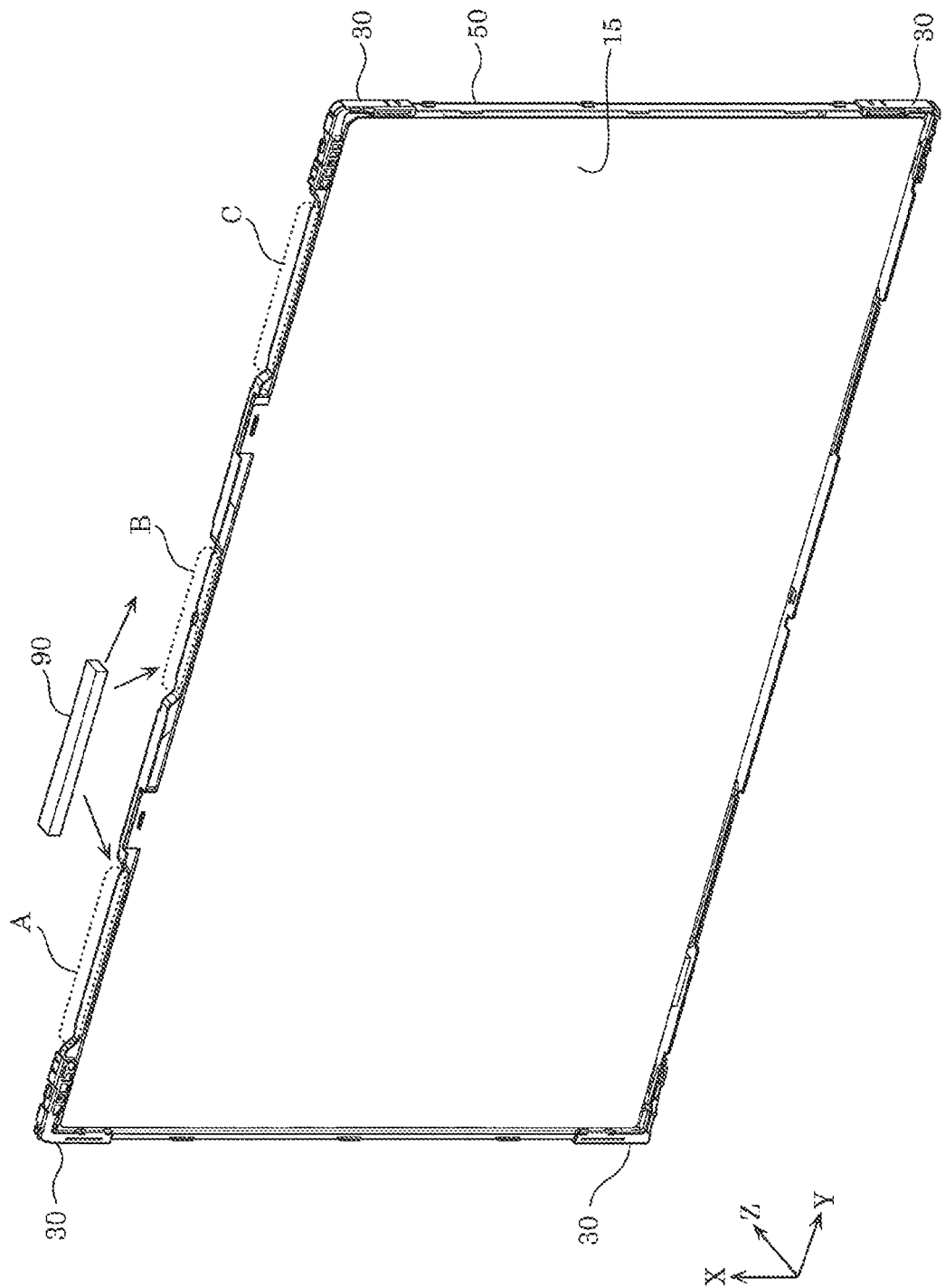
FIG. 9 is a perspective view of a placement example of a receiver on the base plate.

FIG. 9 is a perspective view of a placement example of receiver 90 on base plate 50. Three spaces (spaces A, B, and C in FIG. 9) at which some type of component can be disposed are present on an upper end portion of base plate 50 according to Embodiment 1 between the two holder fittings 55 and to the left and right sides of the two holder fittings 55. Accordingly, at least one of these spaces may include receiver 90 for receiving a predetermined signal. In other words, receiver 90 for receiving the predetermined signal may be disposed on base plate 50 between the two corner components 30 disposed at the two adjacent corners.

To be specific, spaces A, B, and C shown in FIG. 9 are areas concealed by bezel 20 (see FIG. 1) in the front view. Thus, a control signal and the like can be received from an external apparatus by disposing receiver 90 in any of these spaces A, B, and C without altering the exterior of image display apparatus 1. Since bezel 20 disposed in front of receiver 90 generally includes a resin, it can be said that it is easy to receive a signal transmitted from the front of image display apparatus 1 compared to when, for example, receiver 90 is disposed behind the metal base plate 50.

Note that receiver 90 is an antenna for receiving a signal transmitted from a portable device, e.g. a dedicated remote control or a smartphone, in accordance with a predetermined communication method, e.g. a wireless local area network (LAN) or Bluetooth®. Receiver 90 may also be an optical receiver for receiving infrared light emitted from an infrared remote control. In this case, a portion of a front of receiver 90 in bezel 20 may include a light-transmissive component for allowing the infrared light to pass through.

A position of light source 60 in backlight unit 11 is not limited to being left of light guide plate 12 in the in the front view. For example, light source 60 may also be disposed on both the left and right sides of light guide plate 12. Light source 60 may also be disposed at least one of above and below light guide plate 12. In either case, the leaking of light from light source 60 can be limited by disposing light source cover 70 in front of light source 60 and wrapping the end portions of light source cover 70 and a portion of corner component 30 over light source 60.

The four corner components 30 disposed at the four corners of base plate 50 may have the same shape and size, and may also have different shapes and sizes. In other words, as long as the four corner components 30 can be attached to the four corners of base plate 50 in a suitable state, the four corner components 30 may be shared and may also not be shared.

Light source cover 70 does not need to include a metal such as stainless copper, but may also include a non-metal such as a resin. For example, by having light source cover 70 include a white resin, the inner surface (surface facing light source 60) can also serve as light-reflective surface 71.

In the present embodiment, image display apparatus 1 is realized as, for example, a liquid crystal television. However, the configuration of image display apparatus 1 may, for example, also be used for a monitor for personal computers, a portable device such as a tablet or a smartphone, and the like.

Embodiment 2

Hereinafter, an image display apparatus having a structure in which the leaking of light is effectively limited will be described as Embodiment 2.

PTL 2 listed as prior art as prior art document discloses an image display apparatus including a display panel and an edge-lit backlight that radiates light to a rear surface of the display panel. The edge-lit backlight includes a light guide plate and a light source facing an edge face of the light guide plate. Light from the light source is incident on the edge face of the light guide plate. The light incident on the edge face of the light guide plate is emitted from a front surface (main surface) of the light guide plate to the rear surface of the display panel.

The inventors have identified the following problem with regard to the above technique.

In recent years, the demand for thinner frames by making a span of rectangular and frame-shaped decorative bezels that cover outer edges of the display panel smaller has been increasing for image display apparatuses. However, when a thinner frame is implemented in the image display apparatus in PTL 2, light strongly propagating forward, which is a portion of the light incident on the edge face of the light guide plate, leaks from the front surface of the display panel, and so-called light leakage occurs. With this, local bright spots (so-called hotspots) occur proximate to the light source at the front surface of the display panel.

The present disclosure provides an image display apparatus that can limit the leaking of light from the display panel.

The image display apparatus in the present disclosure includes a display panel including a front surface on which an image is displayed; a light guide plate having an edge face and a main surface that emits the light incident on the edge face of the light guide plate toward a rear surface of the display panel; a light source facing the edge face of the light guide plate; an optical sheet disposed between the display panel and the light guide plate; and a shade disposed between the display panel and the light guide plate for blocking the light from the main surface at an end portion of the light guide plate facing the light source.

The image display apparatus in the present disclosure makes it possible to limit the leaking of light from the display panel.

1. Configuration of Image Display Apparatus

Figure 10:
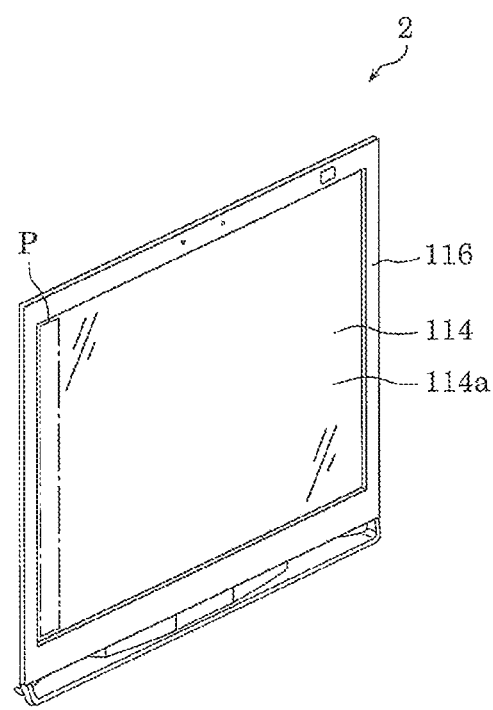
FIG. 10 is a perspective view of an image display apparatus according to Embodiment 2.
Figure 11:
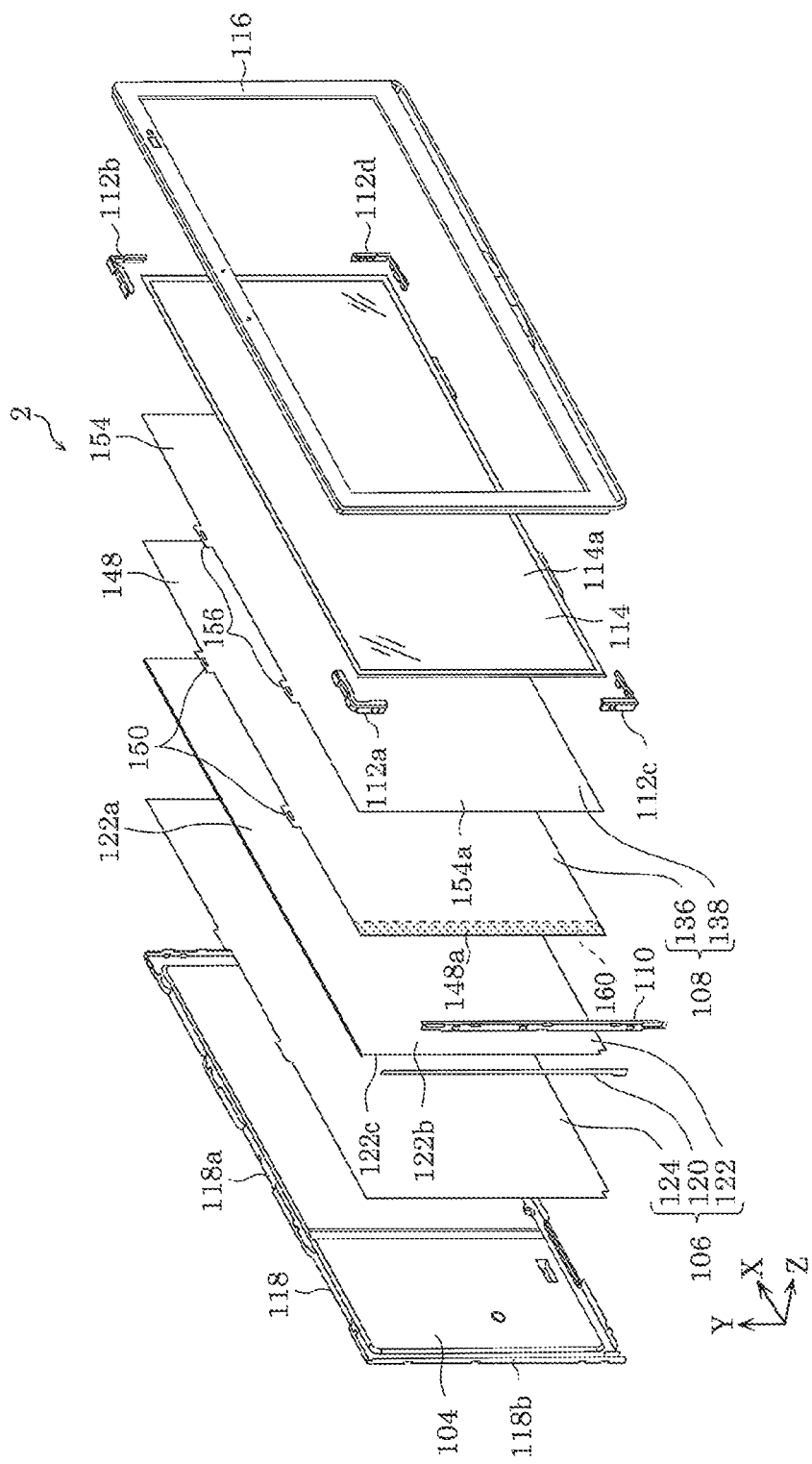
FIG. 11 is an exploded perspective view of the image display apparatus according to Embodiment 2.
Figure 12:
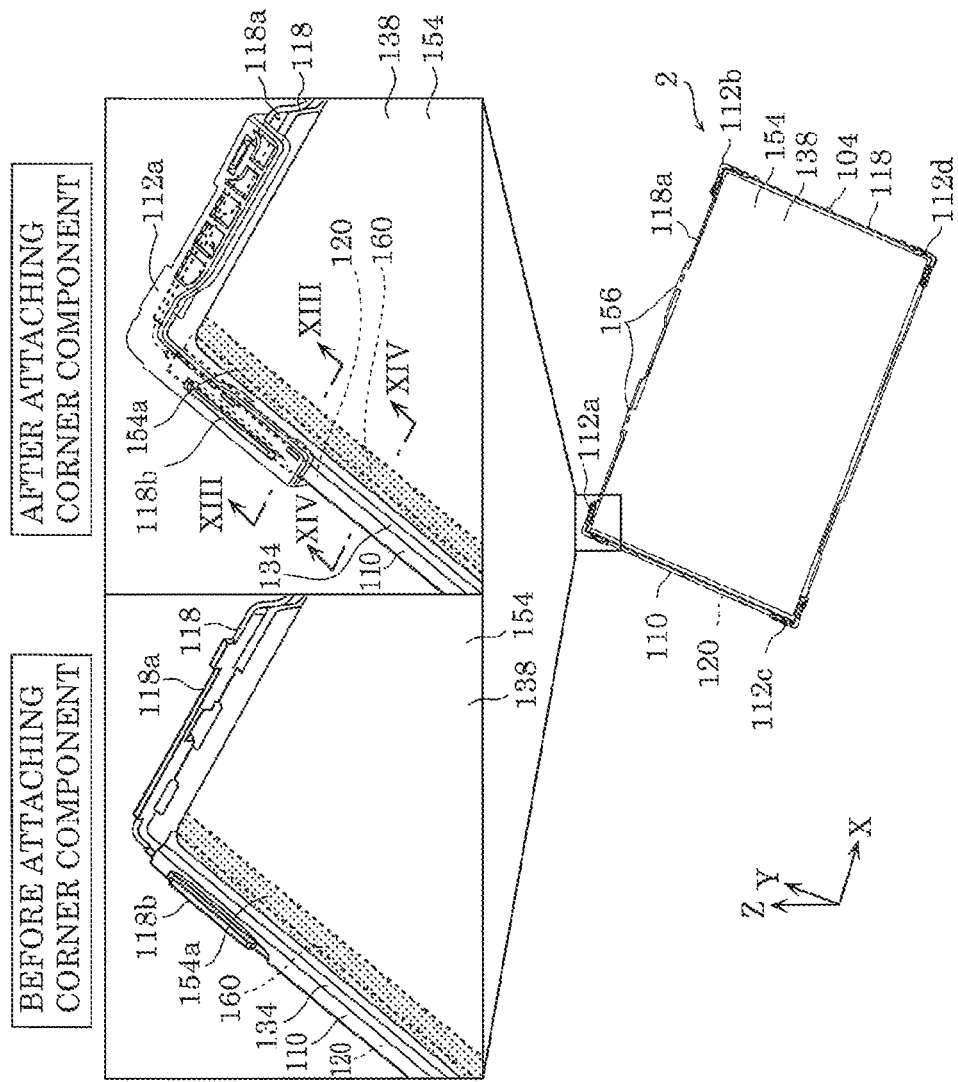
FIG. 12 is a perspective view of the image display apparatus according to Embodiment 2 with a bezel and a display panel detached therefrom.
Figure 13:
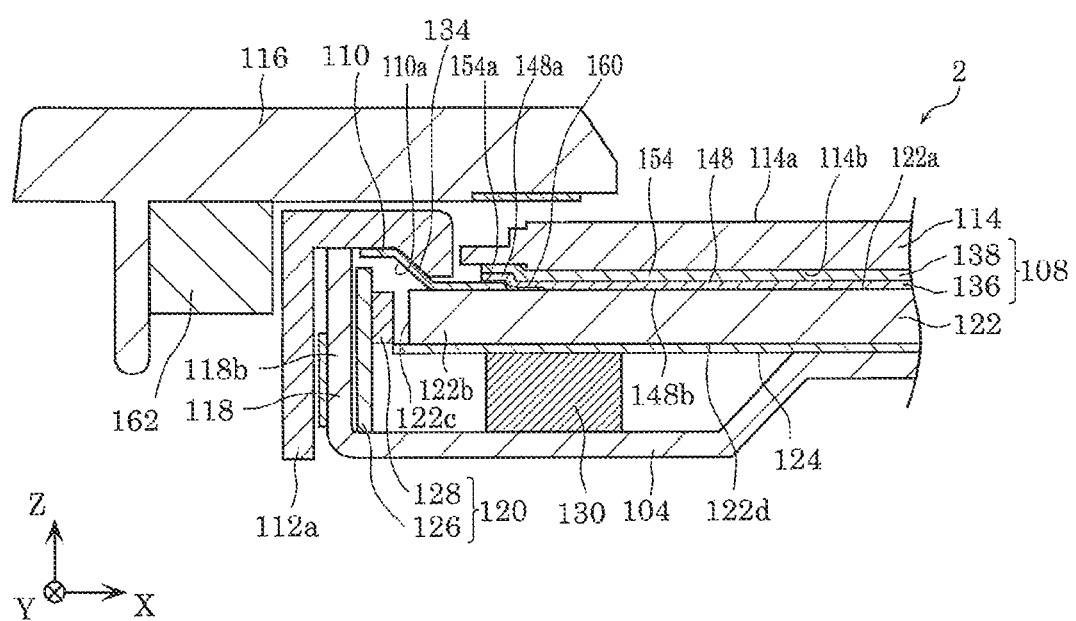
FIG. 13 is a cross-sectional view of a main part of the image display apparatus according to Embodiment 2 along line XIII-XIII in FIG. 12.
Figure 14:
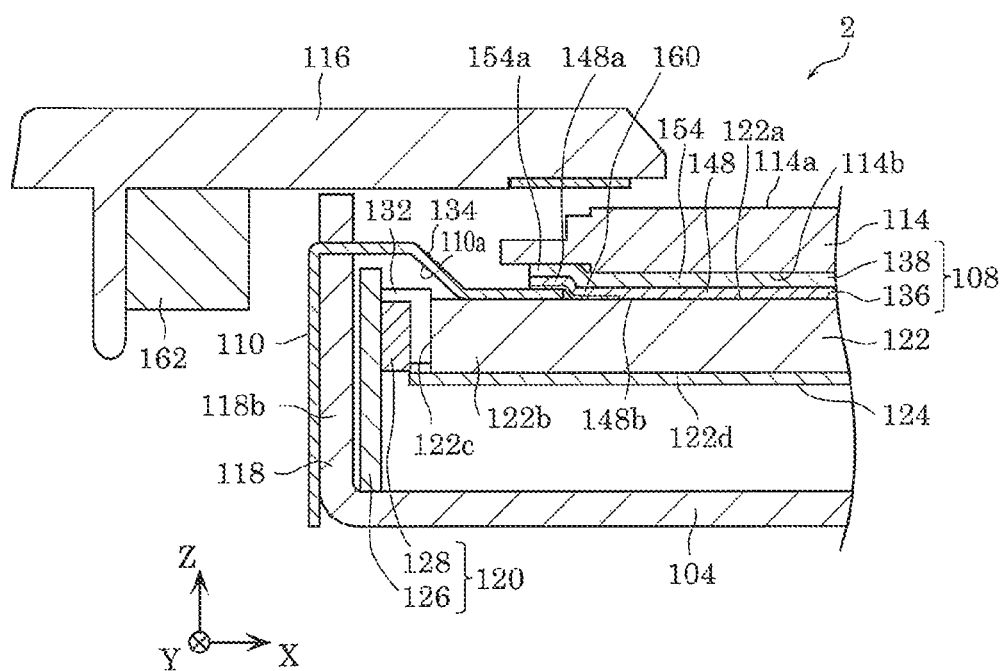
FIG. 14 is a cross-sectional view of the main part of the image display apparatus according to Embodiment 2 along line XIV-XIV in FIG. 12.
Figure 15A:
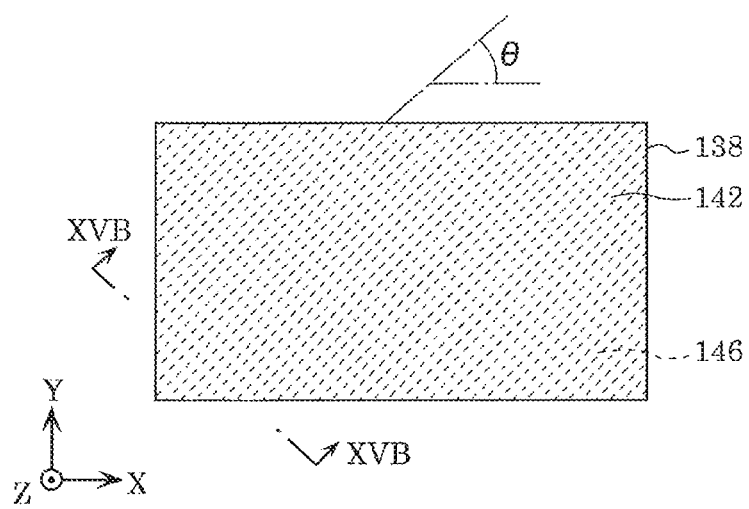
FIG. 15A is a schematic plan view for describing a configuration of a second optical sheet according to Embodiment 2.
Figure 15B:
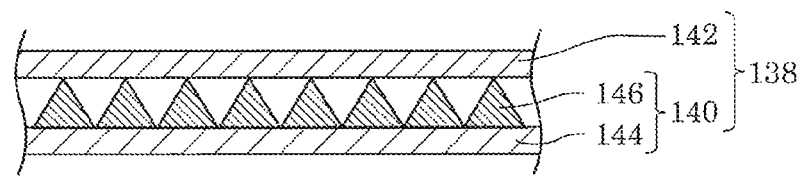
FIG. 15B is a schematic cross-sectional view of the second optical sheet according to Embodiment 2 along line XVB-XVB in FIG. 15A.
Figure 16:
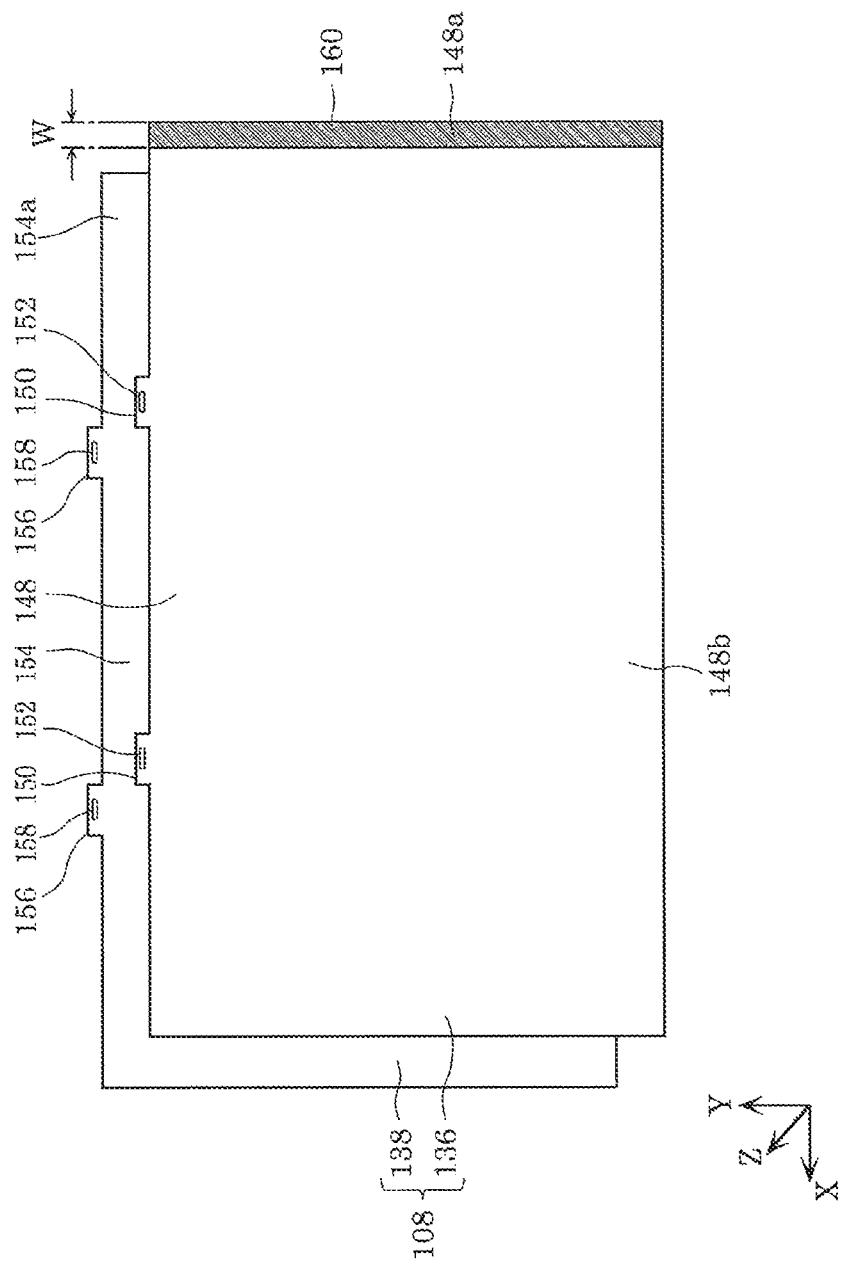
FIG. 16 is an exploded perspective view of an optical sheet section according to Embodiment 2.
Figure 17:
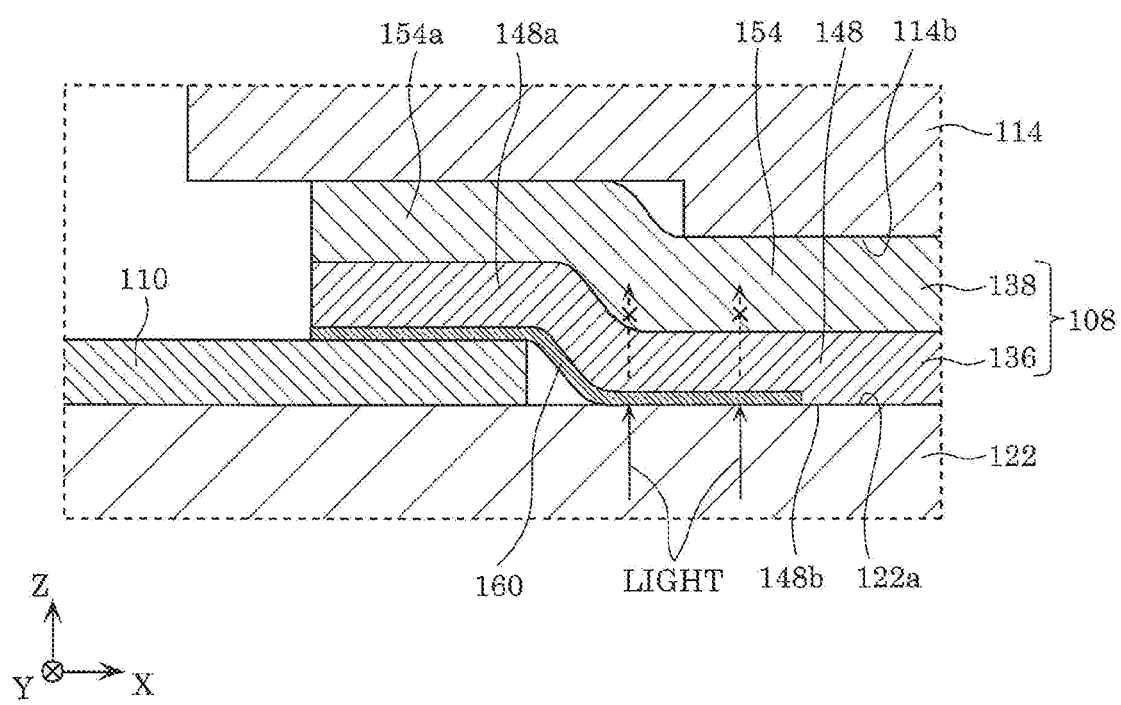
FIG. 17 is a cross-sectional view of the main part of the image display apparatus according to Embodiment 2 enlarging a portion of FIG. 14.

A configuration of image display apparatus 2 according to Embodiment 2 will be described first with reference to FIGS. 10 to 17. FIG. 10 is a perspective view of image display apparatus 2 according to Embodiment 2. FIG. 11 is an exploded perspective view of image display apparatus 2 according to Embodiment 2. FIG. 12 is a perspective view of image display apparatus 2 according to Embodiment 2 with bezel 116 and display panel 144 detached therefrom. FIG. 13 is a cross-sectional view of a main part of image display apparatus 2 according to Embodiment 2 along line XIII-XIII in FIG. 12. FIG. 14 is a cross-sectional view of the main part of image display apparatus 2 according to Embodiment 2 along line XIV-XIV in FIG. 12. FIG. 15A is a schematic plan view for describing a configuration of second optical sheet 138 according to Embodiment 2. FIG. 15B is a schematic cross-sectional view of second optical sheet 138 according to Embodiment 2 along line XVB-XVB in FIG. 15A. FIG. 16 is an exploded perspective view of optical sheet section 108 according to Embodiment 2. FIG. 17 is a cross-sectional view of the main part of image display apparatus 2 according to Embodiment 2 enlarging a portion of FIG. 14.

As illustrated in FIG. 10, image display apparatus 2 is, for example, a small (e.g. 15") portable liquid crystal television set. The user can easily carry image display apparatus 2 to, for example, a place of reference inside their house.

As illustrated in FIGS. 10 and 11, image display apparatus 2 includes base plate 104, backlight 106, optical sheet section 108, light source cover 110, corner components 112a, 112b, 112c, and 112d (112a to 112d), display panel 114, and bezel 116.

As illustrated in FIG. 11, base plate 104 is a component for supporting backlight 106, optical sheet section 108, and light source cover 110 and is also referred to as back frame. Base plate 104 includes a thin sheet metal and is rectangular in an XY-plane view. As illustrated in FIGS. 11 to 14, outer edges of base plate 104 include side wall 118 that extends toward display panel 114. Side wall 118 is formed, for example, by bending the sheet metal, and is disposed along an entirety of the outer edges of base plate 104. An upper side end portion 118a of side wall 118 when image display apparatus 2 is placed includes protrusions (not illustrated) for supporting optical sheet section 108. The protrusions are formed by, for example, lancing the sheet metal, and are disposed with spaces therebetween along end portion 118a of side wall 118.

As illustrated in FIG. 11, backlight 106 is an edge-lit backlight. Backlight 106 includes light source 120, light guide plate 122, and reflection sheet 124.

Light source 120 emits light. As illustrated in FIGS. 13 and 14, light source 120 includes substrate 126 and LED elements 128. Substrate 126 is an elongated printed wiring assembly. Substrate 126 is attached to a left side end portion 118b (left side end portion in the front view of image display apparatus 2) of side wall 118 of base plate 104 when image display apparatus 2 is placed using, for example, thermally conductive double-sided tape. Note that substrate 126 includes a highly thermally conductive metal, e.g. aluminum. LED elements 128 are mounted on substrate 126. LED elements 128 are disposed in a row along a length of substrate 126 (Y-axis) with spaces therebetween. LED elements 128 are each, for example, a chip LED.

As illustrated in FIG. 11, light guide plate 122 is rectangular and plate-shaped in the XY-plane view. Light guide plate 122 is formed using, for example, an acrylic resin injection mold. As illustrated in FIG. 13, light guide plate 122 is supported by the inner surface of base plate 104 (surface facing display panel 114) via cushion 130. Main surface 122a of light guide plate 122 faces rear surface 114b of display panel 114. Edge face 122c of end portion 122b of light guide plate 122 facing light source 120 faces LED elements 128 of light source 120. In other words, LED elements 128 are disposed with spaces therebetween along a length of edge face 122c of light guide plate 122. Light from LED elements 128 is incident on edge face 122c of light guide plate 122. Note that, as illustrated in FIG. 14, spacer 132 for forming a gap between LED elements 128 and edge face 122c of light guide plate 122 is attached to substrate 126.

As illustrated in FIGS. 11, 13, and 14, reflection sheet 124 covers rear surface 122d (surface opposite to the side of main surface 122a) of light guide plate 122. Reflection sheet 124 reflects the light incident on edge face 122c of light guide plate 122 toward main surface 122a of light guide plate 122. The light reflected by reflection sheet 124 is emitted from main surface 122a of light guide plate 122 and incident on rear surface 114b of display panel 114.

As illustrated in FIG. 11, light source cover 110 is a cover component for covering light source 120 and end portion 122b of light guide plate 122 from behind display panel 114. As illustrated in FIGS. 12 to 14, light source cover 110 is elongated and is attached to end portion 118b of side wall 118 on base plate 104 via a recess/protrusion fitting. In other words, light source cover 110 extends along a side of end portion 122b (side that extends along the Y-axis) of light guide plate 122. As illustrated in FIGS. 13 and 14, light source cover 110 includes slanted portion 134 that slants away from light guide plate 122 in a direction from end portion 120 of light guide plate 122 to light source 120. Note that light source cover 110 includes, for example, a metal, e.g. stainless steel (stainless copper) with a thickness of, for example, approximately 0.2 mm. The surface of light source cover 110 facing light source 120 is light-reflective surface 110a. A portion of the light from LED elements 128 is incident on edge face 122c of light guide plate 122 after being reflected by light-reflective surface 110a of light source cover 110.

As illustrated in FIG. 11, optical sheet section 108 includes first optical sheet 136 and second optical sheet 138 that have different optical properties. As illustrated in FIGS. 13 and 14, first optical sheet 136 and second optical sheet 138 are disposed between display panel 114 and light guide plate 122 in an overlapping state. First optical sheet 136 faces light guide plate 122 and second optical sheet 138 faces display panel 114. Thicknesses of first optical sheet 136 and second optical sheet 138 are, for example, between 0.1 mm and 0.5 mm.

First optical sheet 136 is a diffusion sheet for diffusing the light emitted from main surface 122a of light guide plate 122. Second optical sheet 138 is a composite sheet functioning as (i) a diffusion sheet that diffuses the light emitted from main surface 122a of light guide plate 122 and (ii) a prism sheet that focuses the light emitted from main surface 122a of light guide plate 122, and is also called a Diffuser on Prism (DoP) sheet.

As illustrated in FIGS. 15A and 15B, second optical sheet 138 is formed by gluing together prism sheet 140 and diffusion sheet 142. Prism sheet 140 includes base layer 144 and prisms 146 disposed on base layer 144. Prisms 146 are only horizontally (X-axis) slanted at angle θ. Angle θ is a bias angle that satisfies $0° < θ ≤ 7°$, and is, for example, 4°. Prisms in conventional prism sheets are horizontally parallel. In such a configuration, however, since the prisms are horizontally parallel with pixel rows of display panel 114 (X-axis), there is a risk of moiré occurring due to interference between the prisms and the pixels of display panel 114. In contrast, in the present embodiment, since prisms 146 are slanted with respect to the pixel rows of display panel 114, interference between prism section 146 and the pixels of display panel 114 is limited and the occurrence of the above moiré can be limited as well.

As illustrated in FIG. 16, first optical sheet 136 includes rectangular first sheet main body 148 in the XY-plane view and first tabs 150 protruding upward (positive Y-axis) from an upper side end portion of first sheet main body 148 when image display apparatus 2 is set up. First tabs 150 are disposed with spaces therebetween along the upper side end portion of first sheet main body 148. First tabs 150 each include an elongated first through-hole 152.

Second optical sheet 138 includes, similar to first optical sheet 136, a rectangular second sheet main body 154 in the XY-plane view and second tabs 156 protruding upward from an upper side end portion of second sheet main body 154 when image display apparatus 2 is set up. Second tabs 156 are disposed with spaces therebetween along the upper side end portion of second sheet main body 154. Second tabs 156 each include an elongated second through-hole 158.

First tabs 150 each overlap a corresponding one of second tabs 156. The protrusions on base plate 104 are inserted into first through-hole 152 in first tabs 150 and second through-hole 158 in second tabs 156. With this, first optical sheet 136 and second optical sheet 138 are supported in a suspended fashion from the protrusions on base plate 104 in an overlapping state. As illustrated in FIGS. 13 and 14, first sheet main body 148 and second sheet main body 154 cover main surface 122a of light guide plate 122 in an overlapping state.

As illustrated in FIGS. 16 and 17, end portion 148a of first sheet main body 148 of first optical sheet 136 facing light source 120 includes shade 160 for blocking the light from main surface 122a at end portion 122b of light guide plate 122. Shade 160 is an area in which a light-blocking ink is printed on surface 148b of first sheet main body 148 facing light guide plate 122 (patterned area in FIG. 16). The light-blocking ink is, for example, black ink. Shade 160 is strip-shaped and extends along a side of end portion 148a of first sheet main body 148 (side extending along the Y-axis) facing light source 120. As illustrated in FIGS. 13 and 14, shade 160 is disposed in an area that overlaps bezel 116 in the XY-plane view. A width of shade 160 (X-axis) is, for example, between 3 mm and 5 mm. Note that shade 160 does not necessarily need to completely block the light from main surface 122a of light guide plate 122, and may also only partially block the light from main surface 122a of light guide plate 122.

As illustrated in FIG. 17, end portion 148a of first sheet main body 148 facing light source 120 and end portion 154a of second sheet main body 154 facing light source 120 are slidable on a surface of light source cover 110 opposite to the side of light source 120 in an overlapping state. Shade 160 covers main surface 122a of end portion 122b of light guide plate 122 facing light source 120.

As illustrated in FIG. 11, corner components 112a to 112d support four corners of display panel 114. Corner components 112a to 112d are substantially L-shaped. As illustrated in FIGS. 12 and 13, corner components 112a to 112d are attached to the four corners of base plate 104 via a recess/protrusion fitting. As illustrated in FIG. 12, the pair of corner components 112a and 112c on the side of light source 120, from the corner components 112a to 112d, overlap longitudinal end portions of light source cover 110 (Y-axis). Note that corner components 112a to 112d include, for example, a resin, e.g. polycarbonate.

As illustrated in FIG. 11, display panel 114 is a so-called liquid crystal cell including liquid crystals inserted between glass substrates. Front surface 114a (surface opposite to side of rear surface 114b) of display panel 114 includes a display surface for displaying an image. As illustrated in FIG. 13, the four corners of display panel 114 are supported by corner components 112a to 112d.

As illustrated in FIG. 11, bezel 116 is a component for protecting and decorating the outer edges of front surface 114a of display panel 114. Bezel 116 is rectangular and frame-shaped in the XY-plane view. As illustrated in FIGS. 13 and 14, bezel 116 covers the outer edges of front surface 114a of display panel 114. As illustrated in FIG. 13, cushion 162 is interposed between bezel 116 and the outer edges of each of corner components 112a to 112d. Note that bezel 116 includes, for example, a resin, e.g. polycarbonate.

As described above, in the present embodiment, image display apparatus 2 includes display panel 114 including front surface 114a on which an image is displayed; light guide plate 122 including edge face 122c and main surface 122a that emits the light incident on edge face 122c of light guide plate 122 toward rear surface 114b of display panel 114; light source 120 facing edge face 122c of light guide plate 122; first optical sheet 136 disposed between display panel 114 and light guide plate 122; shade 160 disposed between display panel 114 and light guide plate 122 for blocking the light from main surface 122a at end portion 122b of light guide plate 122 facing light source 120.

With this, shade 160 blocks the light from main surface 122a of end portion 122b of light guide plate 122 facing light source 120. Thus, even when a thinner frame is implemented in image display apparatus 2, it is possible to limit light strongly propagating forward, which is a portion of the light incident on edge face 122c of light guide plate 122, leaking from front surface 144a of display panel 114. This makes it possible to limit local bright spots (so-called hotspots) occurring proximate to light source 120 at front surface 114a of display panel 114 (area surrounded by a dash-dotted line frame border P in FIG. 10).

In the present embodiment, shade 160 is disposed on end portion 148a of first optical sheet 136 facing light source 120.

This makes it possible to form shade 160 using first optical sheet 136 disposed between display panel 114 and light guide plate 122.

In the present embodiment, shade 160 is strip-shaped along a side of end portion 148a of first optical sheet 136.

This makes it possible to reliably limit light leaking from display panel 114.

In the present embodiment, shade 160 is an area in which a light-blocking ink is printed on end portion 148a of first optical sheet 136.

This makes it possible to readily form shade 160 on first optical sheet 136.

In the present embodiment, the ink is printed on surface 148b of end portion 148a of first optical sheet 136 facing light guide plate 122.

This makes it possible to effectively limit light being incident on an inside of first optical sheet 136 using shade 160. As a result, the leaking of light from display panel 114 can reliably be limited.

In the present embodiment, the ink is black.

This makes it possible to increase the light-blocking rate of shade 160.

In the present embodiment, image display apparatus 2 further includes light source cover 110 that extends along a side of end portion 122b of light guide plate 122, and covers light source 120 and end portion 122b of light guide plate 122 from behind display panel 114. A surface of light source cover 110 facing light source 120 is light-reflective surface 110a. End portion 148a of first optical sheet 136 is slidable on a surface of light source cover 110 opposite to the side of light source 120.

This makes it possible to reliably limit hotspots occurring proximate to light source 120 at front surface 114a of display panel 114 since light source cover 110 covers light source 120 and end portion 122b of light guide plate 122 from behind display panel 114. End portion 148a of first optical sheet 136 is slidable on a surface of light source cover 110 opposite to the side of light source 120. This makes it possible to limit creases from occurring in first optical sheet 136 due to first optical sheet 136 sliding on a surface of light source cover 110 even when first optical sheet 136 expands due to heat generated from light source 120.

In the present embodiment, light source cover 110 includes slanted portion 134 that slants away from light guide plate 122 in a direction from end portion 122b of light guide plate 122 to light source 120.

With this, a portion of the light from light source 120 is incident on edge face 122c of light guide plate 122 after being reflected by light-reflective surface 110a of slanted portion 134. As a result, a usage efficiency of the light from light source 120 can be increased. This makes it possible to limit creases from occurring in first optical sheet 136 due to first optical sheet 136 running over slanted portion 134 of light source cover 110 even when first optical sheet 136 expands due to heat generated from light source 120.

In the present embodiment, image display apparatus 2 further includes (i) base plate 104 that supports light guide plate 122 and light source 120, and (ii) corner components 112a to 112d for supporting the four corners of display panel 114 and that are attached to the four corners of base plate 104. Light source cover 110 is attached to end portion 118b of base plate 104 facing light source 120. A pair of corner components 112a and 112c on the side of light source 120, from the corner components 112a to 112d, overlap the longitudinal end portions of light source cover 110.

In conventional image display apparatuses, a rectangular molded frame is used that supports the entirety of the outer edges of the display panel. In the present embodiment, it is possible to make image display apparatus 2 lighter since corner components 112a to 112d support the four corners of display panel 114 instead of a conventional molded frame. The pair of corner components 112a and 112c overlap the longitudinal end portions of light source cover 110. Thus, there are no gaps between the pair of corner components 112a and 112c and the longitudinal end portions of light source cover 110 when looking at front surface 114a of display panel 114 perpendicularly. As a result, light leaking corners of display panel 114 (areas proximate to the pair of corner components 112a and 112c) can reliably be limited.

Other Embodiments Related to Embodiment 2

Embodiment 2 is described above as an example of the technique disclosed in the present application. However, the technique in the present disclosure is not limited to the above embodiment; various changes, substitutions, additions, omissions, etc., may be made to the embodiment. Each component included in the above Embodiment 2 may be combined to achieve new embodiments.

Accordingly, other embodiments related to Embodiment 2 will be exemplified below.

In Embodiment 2, image display apparatus 2 has been described as a liquid crystal television set, but is not limited thereto. Image display apparatus 2 may be used as a variety of apparatuses, e.g. a liquid crystal display for personal computers.

In Embodiment 2, optical sheet section 108 includes first optical sheet 136 and second optical sheet 138, but is not limited thereto, and may also include one optical sheet or at least 3 optical sheets.

In Embodiment 2, shade 160 includes black ink, but is not limited thereto, and may include ink with a color of choice, e.g. deep gray.

In Embodiment 2, shade 160 is disposed on end portion 148a of first sheet main body 148 of first optical sheet 136, but is not limited thereto. Shade 160 may be disposed, for example, on end portion 154a of second sheet main body 154 of second optical sheet 138 facing light source 120, and may also be disposed on main surface 122a at end portion 122b of light guide plate 122.

In Embodiment 2, shade 160 includes ink printed on first optical sheet 136, but is not limited thereto, and may also include, for example, a film-type light-blocking tape pasted on end portion 148a of first sheet main body 148 of first optical sheet 136.

In Embodiment 2, the four corners of display panel 114 are supported by corner components 112a to 112d, but the entirety of the outer edges of display panel 114 may also be supported by a rectangular and frame-shaped molded frame instead of corner components 112a to 112d. In this case, light source cover 110 may be omitted.

Embodiment 2 is described above as an example of the technique disclosed in the present application. The accompanying drawings and the detailed description are provided for this purpose.

Therefore, the components described in the accompanying drawings and the detailed description include, in addition to components essential to overcoming problems, components that are not essential to overcoming problems but are included in order to exemplify the technique described above. Thus, those non-essential components should not be deemed essential due to the mere fact that they are illustrated in the accompanying drawings and described in the detailed description.

The above embodiments are for providing examples of the technique in the present disclosure, and thus various modifications, substitutions, additions, and omissions are possible in the scope of the claims and equivalent scopes thereof.

INDUSTRIAL APPLICABILITY

The present disclosure can be applied to an image display apparatus for displaying an image. To be specific, the present disclosure can be applied to a television set, monitor display, digital signage, tablet interface, smartphone, desktop display apparatus, or the like.

The invention claimed is:

1. An image display apparatus, comprising:
a display panel including a front surface on which an image is displayed;
a base plate disposed behind the display panel;
a light guide plate disposed between the display panel and the base plate;
a light source that is elongated, disposed along an edge of the base plate, and emits light incident on an edge face of the light guide plate;
a light source cover that is elongated and covers a front of the light source; and
a corner component (i) that is disposed along a corner of the base plate, (ii) that laterally supports the display panel, and (iii) includes a portion that overlaps the light source cover in a front to back direction, wherein
the corner component abuts against an edge face of a corner of the display panel, and does not cover a back face of the corner of the display panel and wherein the corner component is disposed at each of two adjacent corners of the base plate that is rectangular in a front view, the two adjacent corners each being the corner, and two corner components each being the corner component are attached to the base plate without a frame connecting the two of the corner components.

2. The image display apparatus according to claim 1, wherein the light source cover includes a light-reflective surface facing the light source.

3. The image display apparatus according to claim 1, further comprising:
at least one optical sheet disposed between the light guide plate and the display panel, wherein
the corner component is disposed at each of four corners of the base plate that is rectangular in a front view, the four corners each being the corner, and
a support that supports the at least one optical sheet is disposed on the base plate between two of the corner components disposed at two adjacent ones of the four corners.

4. The image display apparatus according to claim 1, wherein the base plate includes a tongue piece that is lanced from a portion of the base plate and abuts against a longitudinal end portion of the light source.

5. The image display apparatus according to claim 1, wherein
the corner component is disposed in each of four corners of the base plate that is rectangular in a front view, the four corners each being the corner, and
a receiver for receiving a predetermined signal is disposed on the base plate between two of the corner components disposed at two adjacent ones of the four corners.

6. The image display apparatus according to claim 1, further comprising:
an optical sheet disposed between the display panel and the light guide plate, wherein
the light source cover extends along a side of an end portion of the light guide plate facing the light source, and covers the light source and the end portion of the light guide plate from behind the display panel,
a surface of the light source cover facing the light source is a light-reflective surface, and
an end portion of the optical sheet is slidable on a surface of the light source cover opposite to the side of the light source.

7. The image display apparatus according to claim 1, wherein
the light guide plate includes a main surface that emits the light incident on the edge face of the light guide plate toward a rear surface of the display panel, and
the image display apparatus further comprises:
an optical sheet disposed between the display panel and the light guide plate; and
a shade disposed between the display panel and the light guide plate for blocking the light from the main surface at an end portion of the light guide plate facing the light source.

8. The image display apparatus according to claim 3, further comprising:
a reflection sheet disposed between the light guide plate and the base plate, wherein
the reflection sheet is restricted in movement in a direction perpendicular to the front to back direction due to abutting against the support.

9. The image display apparatus according to claim 6, wherein the light source cover includes a slanted portion that slants away from the light guide plate in a direction from the end portion of the light guide plate to the light source.

10. The image display apparatus according to claim 7, wherein the shade is disposed on an end portion of the optical sheet facing the light source.

11. The image display apparatus according to claim 10, wherein the shade is strip-shaped and extends along a side of the end portion of the optical sheet.

12. An image display apparatus, comprising:
a display panel including a front surface on which an image is displayed;
a base plate disposed behind the display panel;
a light guide plate disposed between the display panel and the base plate;
a light source that is elongated, disposed along an edge of the base plate, and emits light incident on an edge face of the light guide plate;
a light source cover that is elongated and covers a front of the light source; and
a corner component (i) that is disposed along a corner of the base plate, (ii) that laterally supports the display panel, and (iii) includes a portion that overlaps the light source cover in a front to back direction, wherein the corner component is disposed at each of two adjacent corners of the base plate that is rectangular in a front view, the two adjacent corners each being the corner, and two corner components each being the corner component are attached to the base plate without a frame connecting the two of the corner components.

13. An image display apparatus, comprising:

a display panel including a front surface on which an image is displayed;

a base plate disposed behind the display panel;

a light guide plate disposed between the display panel and the base plate;

a light source that is elongated, disposed along an edge of the base plate, and emits light incident on an edge face of the light guide plate;

a light source cover that is elongated and covers a front of the light source; and a corner component (i) that is disposed along a corner of the base plate, (ii) that laterally supports the display panel, and (iii) includes a portion that overlaps the light source cover in a front to back direction, and at least one optical sheet disposed between the light guide plate and the display panel, wherein the corner component is disposed at each of four corners of the base plate that is rectangular in a front view, the four corners each being the corner, a support that supports the at least one optical sheet, and includes a protrusion, is disposed on the base plate between two of the corner components disposed at two adjacent ones of the four corners, and the at least one optical sheet has an opening passing through in a thickness direction, and the protrusion of the support is inserted in the opening to support the at least one optical sheet.

* * * * *